(12) United States Patent
Stewart, III et al.

(10) Patent No.: US 7,156,465 B2
(45) Date of Patent: Jan. 2, 2007

(54) PORTABLE VERTEBRAE DECOMPRESSION DEVICE WITH ADJUSTABLE HEIGHT SUPPORT

(75) Inventors: Kenneth G. Stewart, III, Sarasota, FL (US); Thomas Sweeney, Sarasota, FL (US)

(73) Assignee: The Idea People LLC, Newark, DE (US)

( * ) Notice: Subject to any disclaimer, the term of this patent is extended or adjusted under 35 U.S.C. 154(b) by 742 days.

(21) Appl. No.: 10/023,977

(22) Filed: Dec. 21, 2001

(65) Prior Publication Data

US 2004/0124688 A1     Jul. 1, 2004

(51) Int. Cl.
  *A47C 7/40*    (2006.01)
  *A47C 7/42*    (2006.01)
  *A47C 7/54*    (2006.01)
  *A47C 15/00*   (2006.01)

(52) U.S. Cl. .............................. 297/411.36; 297/230.1; 297/230.11; 297/230.12; 297/230.13; 297/230.14; 297/250.1; 297/256; 297/256.16; 297/352; 297/464; 297/485; 297/487

(58) Field of Classification Search ........... 297/411.36, 297/411.1, 411.24, 411.23, 352, 250.1, 230.1, 297/230.11, 230.12, 230.13, 230.14, 256, 297/256.16, 464, 485, 487
See application file for complete search history.

(56) References Cited

U.S. PATENT DOCUMENTS

| 107,049 | A | * | 9/1870 | Hitzelberger ............ 297/487 X |
| 1,515,564 | A | * | 11/1924 | Field ........................ 297/250.1 |
| 1,623,259 | A | * | 4/1927 | McGregor et al. ....... 297/487 X |
| 2,164,715 | A |   | 7/1939 | Krainbill |
| 2,229,411 | A | * | 1/1941 | Hughes ........................ 297/487 |
| 2,353,316 | A | * | 7/1944 | Muller .......................... 297/487 |
| 2,625,987 | A | * | 1/1953 | Hunter ..................... 297/174 R |
| 2,659,423 | A | * | 11/1953 | Haley ...................... 297/411.24 |
| 2,667,913 | A | * | 2/1954 | Dustin ..................... 297/411.1 |
| 2,689,600 | A | * | 9/1954 | Van Briesen .......... 297/411.24 |
| 2,769,483 | A |   | 11/1956 | Peterson |
| 2,773,542 | A |   | 12/1956 | Chasin |
| 2,797,738 | A |   | 7/1957 | Patterson |
| 3,066,980 | A | * | 12/1962 | Clute ......................... 297/252 |
| 3,093,407 | A |   | 6/1963 | Wilson |
| 3,206,249 | A |   | 9/1965 | Gately |
| 3,216,764 | A |   | 11/1965 | Junkunc |
| 3,316,018 | A |   | 4/1967 | Stith |
| 3,382,000 | A | * | 5/1968 | Sully ..................... 297/411.36 |
| 3,853,372 | A | * | 12/1974 | Meyer ............... 297/411.36 X |
| 3,895,840 | A | * | 7/1975 | Szurszewski .......... 297/230.11 |
| 3,971,592 | A |   | 7/1976 | Farley |
| 3,993,351 | A | * | 11/1976 | Rodaway ............... 297/411.36 |
| 4,489,980 | A | * | 12/1984 | Friedrich ............... 297/411.36 |
| 4,489,981 | A | * | 12/1984 | Goletski ................ 297/411.36 |

(Continued)

FOREIGN PATENT DOCUMENTS

GB         2387776      * 10/2003

*Primary Examiner*—Rodney B. White
*Assistant Examiner*—Stephen Vu
(74) *Attorney, Agent, or Firm*—Barnes & Thornburg LLP

(57) ABSTRACT

A light-weight portable vertebrae decompression support device comprising a pair of arm rests with selectively adjustable members connecting the arm rests and a base member. The base member is adapted to rest on a seat. The selective adjustment raises and lowers the height of the arm rests with respect to the base. The support device provides arm support sufficient to decompress the vertebrae and aids persons recovering from back surgery or those with chronic back problems. The support device can be made adjustable to fit different girth persons.

19 Claims, 2 Drawing Sheets

U.S. PATENT DOCUMENTS

| | | | |
|---|---|---|---|
| 4,763,952 A * | 8/1988 | Gaudreau, Jr. ............... 297/383 |
| 4,770,410 A * | 9/1988 | Brown ................... 297/485 X |
| 4,790,042 A * | 12/1988 | Reich ............................. 5/655 |
| 4,858,259 A | 8/1989 | Simmons et al. |
| 4,967,864 A * | 11/1990 | Boyer et al. ............... 180/65.1 |
| 4,995,126 A * | 2/1991 | Matsuda ........................ 5/421 |
| 5,009,467 A | 4/1991 | McCoy |
| 5,056,863 A | 10/1991 | DeKraker et al. |
| 5,168,590 A * | 12/1992 | O'Sullivan ..................... 5/490 |
| 5,275,315 A | 1/1994 | Carmack et al. |
| 5,346,279 A * | 9/1994 | Pecorella ................. 297/256.1 |
| 5,496,092 A * | 3/1996 | Williams et al. ......... 297/250.1 |
| 5,524,956 A | 6/1996 | Moore |
| 5,547,251 A | 8/1996 | Axelson |
| 5,612,718 A | 3/1997 | Bryan |
| 5,639,145 A | 6/1997 | Alderman |
| 5,697,628 A * | 12/1997 | Spear ..................... 297/487 X |
| 5,749,599 A * | 5/1998 | Gardner ................. 297/487 X |
| 5,797,655 A | 8/1998 | Miles |
| 5,803,544 A | 9/1998 | Block et al. |
| 5,820,152 A * | 10/1998 | Warren-Pfaeffle et al. .................. 297/411.36 X |
| 5,829,837 A * | 11/1998 | Reiersen ..................... 297/352 |
| 5,833,309 A | 11/1998 | Schmitz |
| 5,876,010 A * | 3/1999 | Murphy ................. 248/346.01 |
| 5,882,083 A * | 3/1999 | Robinson ............. 297/230.1 X |
| 6,199,948 B1 | 3/2001 | Bush et al. |
| 6,367,875 B1 * | 4/2002 | Bapst ..................... 297/250.1 |

* cited by examiner

PORTABLE VERTEBRAE DECOMPRESSION DEVICE WITH ADJUSTABLE HEIGHT SUPPORT

BACKGROUND OF THE INVENTION

1. Field of the Invention

The invention relates to a portable support device which provides arm support sufficient to decompress the vertebrae of a human being. More particularly, the invention relates to a portable adjustable device which can be used almost anywhere, in any setting as needed to provide support for a person's extremities in a resting position so as to relieve pressure on the person's vertebrae. The device is useful for persons recovering from back surgery or those with chronic back problems.

A person recovering from back surgery often requires a properly designed straight back chair having armrests which will provide proper arm support to permit decompression of a persons vertebrae. Persons, especially those who are not of average size (e.g., they may have short or long upper arms) may also experience back strain when seated in an improperly designed chair. Back strains can be avoided by using chairs with armrests of the correct height to provide the proper support. This can be particularly important for persons who perform desk work such as secretaries, draftsmen, and the like whose seating arrangements do not provide proper support. The usual desk chair used by such persons has a generally horizontally disposed seat, a generally vertically disposed backrest and no independent height adjustment for the arm rests. Frequently desk chairs are armless so that they present no obstruction when drawn closely into a table or desk.

The present invention provides a portable support device which may be used with any chair to provide acceptable support for a person sitting in a chair.

2. Description of the Related Technology

U.S. Pat. No. 5,009,467 discloses a height adjustable armrest attachment for an armless secretarial chair with left and right elbow rests independently selectively positionable within vertical channels formed in turned back outer ends of respective left and right, oppositely laterally extending bracket members to reduce antigravitational stresses or providing elbow support at a proper height. Superposed inner ends of the bracket members are attached to the chair by fasteners which pass through lateral slots to permit opposite lateral movement of the members to selectively vary the lateral spacing of the rests.

A support device for the physically handicapped is described in U.S. Pat. No. 2,773,542 wherein a floor supported device is described for assisting in the use of commodes and similar articles.

SUMMARY OF THE INVENTION

The invention is directed to a portable arm rest device for placement on existing seating to provide arm and back support that reduces gravitational compression of the vertebrae in a person's spine.

Other objects, advantages and novel features of the present invention will become apparent from the following detailed description of the invention when considered in conjunction with the accompanying drawings.

DETAILED DESCRIPTION OF THE PREFERRED EMBODIMENT

It is within the purview of the preferred embodiment of the invention to provide a portable support device which is easily adjustable (both vertically to set the desired height of the arms and circumferentially to accommodate persons of different girth). The circumferential adjustment also enables the device to accommodate placement on different size seats. The vertical adjustment is relatively easily accomplished, with telescoping tubes having holes that accommodate a pin to set the height or by using, for example, a ratchet type mechanism or threaded together tubes.

An optional feature is to provide a back support.

A further optional feature includes providing pads to reduce discomfort at pressure points.

Different types of arm supports is yet another aspect of the invention. For example, arm supports shaped like those found on crutches is one style and arm supports like those of a desk chair is another.

Providing means for holding hot or cold pads is yet another feature of the invention.

The relative small size and weight of the device enhances its portability and enables use at home, in the workplace and in transportation, it being easily accommodated on a vehicle seat.

Figure 1:
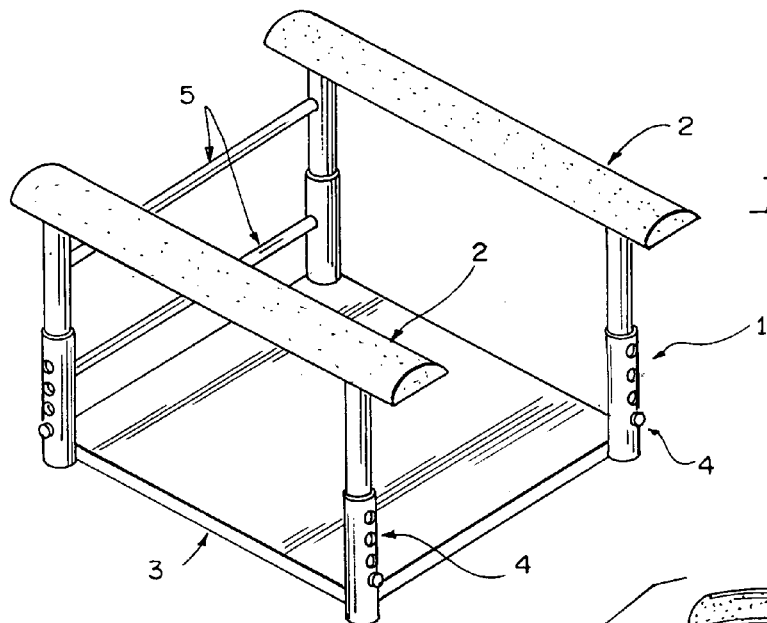
FIG. 1 shows a perspective view of one embodiment according to the invention.

As seen in FIG. 1 of the drawing there is a portable arm rest device 1 that has a pair of arm rests 2 supported by four vertically adjustable supports 4. The device 1 is adapted to rest on a chair, sofa, etc. seat (not shown). The lowest portion of the device is a base 3 which as shown in FIG. 1 is substantially flat on the bottom and is sized to fit most seats, e.g., car seats, chairs, sofas, etc. Of course the base may itself be cushioned or have alternative configurations from the rectangle shown (e.g. circular, C-shaped, U-shaped, etc.). Rigid position supports 5 for maintaining a proper vertical orientation of the arms are also shown in FIG. 1. Supports 5 stabilize the structure and provide a surface for mounting hot or cold packs (not shown) which are beneficial to aid in recuperation from surgery or for therapeutic treatment.

Figure 2:
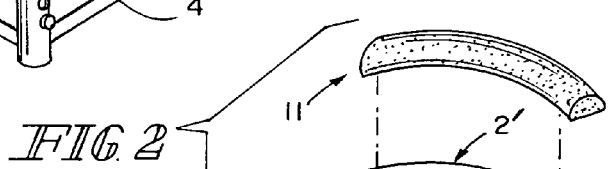
FIG. 2 shows a perspective view of a second embodiment according to the invention.
Figure 4:
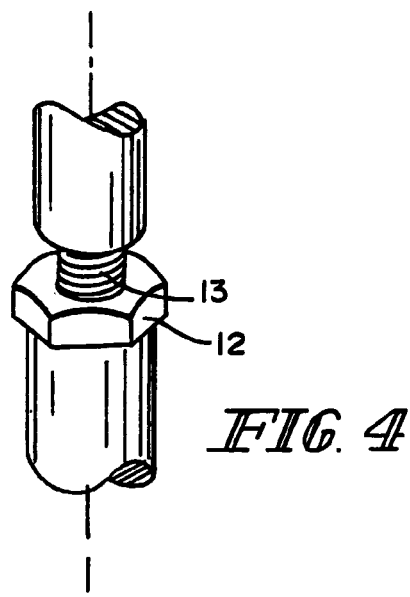
FIG. 4 shows a screw and nut type of adjustment.
Figure 5:
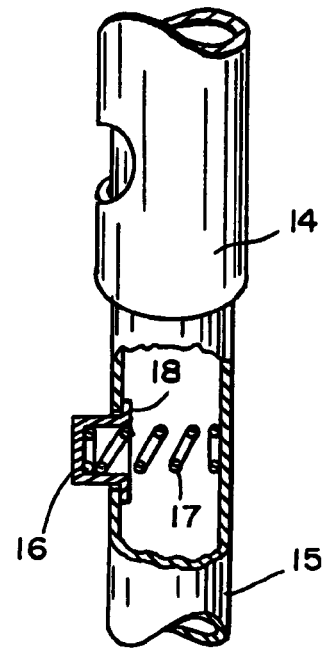
FIG. 5 shows a protruding pin type of adjustment.

As shown in FIG. 2 the device may be of a generally curved (circular, oval, etc.) configuration so as to accommodate placement on various different types of seats and to provide adjustment for persons of different girth. It should be noted that the base 6 in FIG. 2 is different from that of FIG. 1 in that it does not have a portion for a person to sit on. Arm rests 2' and base 6 are permitted to pivot about pivot 8 thus expanding or contracting the size of the device. The device of FIG. 2 has enhanced portability since the pins 8 are removable so as to permit the device to be stored in a suitcase. The height adjustment members 4' are shown as telescoping members with holes for a pin to set the desired height. However, as will be evident the height adjustment may include other types of fasteners, for example, ratchet type mechanisms on the adjustment members may be provided. FIG. 4 shows one type of adjustment member 4 comprising a screw threaded collar 12 fixed to one portion of adjustable member 4 and a screw 13 fixed to the other portion whereby rotation of either, or both, portions relative to the other raises or lowers the arm rests with respect to the base 6. FIG. 5 shows yet another type of adjustable member 4 comprising telescoping tubes 14 and 15 with protruding pin 16. The pin 16 is forced outwardly by spring 17 until the enlarged portion 18 at the end of pin 16 prevents it from escaping the hole in tube 15. When the pin 16 is depressed into tube 15 the tubes may be adjustably moved with respect to each other until the pin 16 protrudes through holes in both tubes 14 and 15. When the pin protrudes through both holes the tubes remain fixed until the pin is pushed back into at least the outer tube. While a coil spring is shown a leaf spring, attached internally, could be used.

Figure 6:
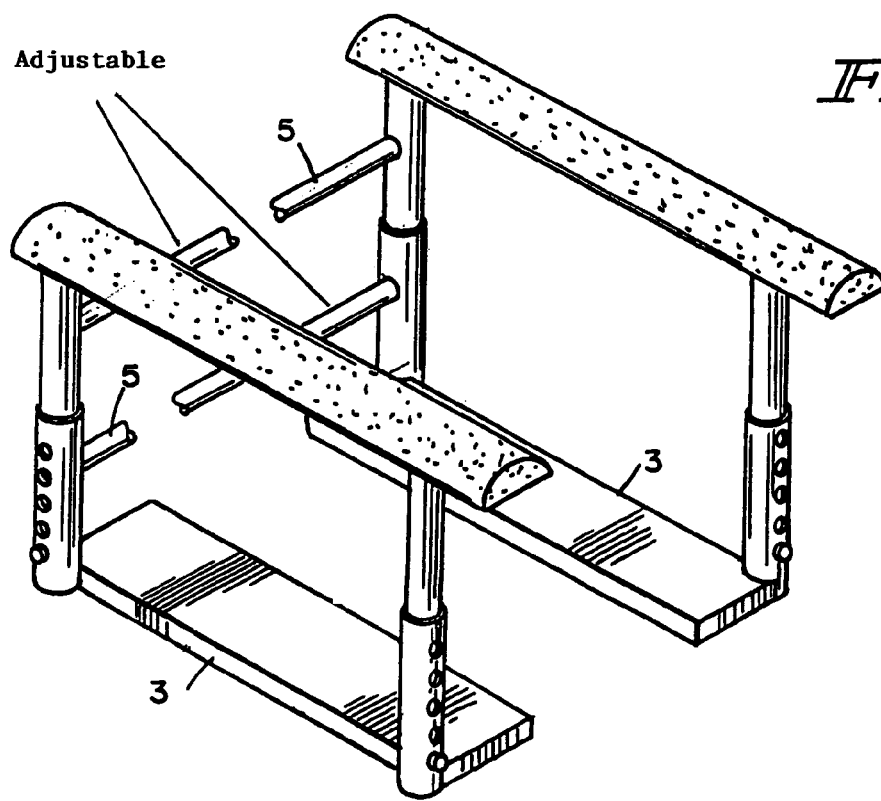
FIG. 6 shows a perspective view of the device of FIG. 1 with adjustable means connecting the arm and base portions of each side of the device.

FIG. 6 shows the support device of FIG. 1 with the supports 5 having adjustable portions (shown as a broken portion) to lengthen or shorten the distance between the arm rest and base on each side. As is evident from FIG. 6 the base 3 is not a single support, but two separate supports.

Straps 7 can be provided with the device and are useful in a variety of ways. As shown in FIG. 2, straps 7 may be affixed to the supports nearest the hand held portion of the arm rests such that when the device is pivoted to enclose a person inside the device the straps can be secured together, much like the ends of a belt, to restrict opening movement of the device about pivot 8. The closure straps can have a simple buckle or hook and loop type fastener (not shown). Other uses for the straps 7 are also anticipated. Specifically, straps of different lengths may be provided with the device to secure a portion of the device to a portion of the persons anatomy. This would be advantageous to enhance comfort particularly where it is desirable to avoid contact between the device and a part of the body which was cut during surgery and may have stitches, staples, etc. Straps 7 could also be used to secure the device to a seat, hook and loop As shown in FIG. 2, an arm cushion 11 is provided to add comfort to pressure points from the elbow to the wrist of a person utilizing the device. Other cushions (not shown) may be provided at other pressure points and are advantageously used to prevent contact between a rigid surface on the device and an injured body portion.

The height adjustable supports 4 and 4' are adjustable over a range from 5" to 18" so as to accommodate a range of persons from the tallest to the shortest. That is, the arm rests can be raised to a height of about 18" above the base or support seat and can be lowered to about 5" above the base or support seat. Three or more concentric supports 4 and/or 4' may be used to provide adjustment to the full 18" height. The arm rests are adapted to fit under the arm pit area much like a crutch. Thus the arm rests are adjustable to provide both arm and shoulder support.

The arm rests, vertical supports and base are made of light-weight, but strong materials. For example, plastic, aluminum or other similar material can be used to provide a device weighing not more than ten pounds, yet of sufficient strength to provide support for decompressing the vertebrae. The underside of the support seat 3 of FIGS. 1 and 3 and of the base 6 of FIG. 2 may preferably have rubber-like nonskid members attached thereto. This is especially useful where the support device is placed on a rigid seat like a toilet or wooden bench and prevents movement of the support device on the seat.

Figure 3:
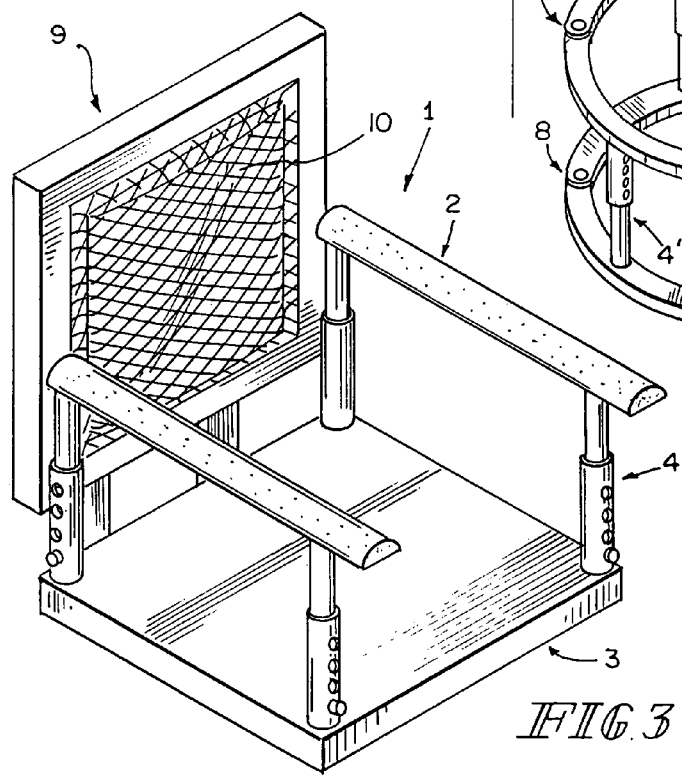
FIG. 3 shows a perspective view of the embodiment of FIG. 1 with an attachment for back support and for accommodating hot or cold pads.

The device in FIG. 3 is similar to that shown in FIG. 1 with the addition of a back support 9. As seen in FIG. 3, back support 9 is generally flat, however, support 9 may be curved to better fit the contour of a persons back. Back support 9 is shown with an attached mesh area for comfort and/or for holding a hot/cold pack container 10. Container 10 has two layers of mesh which can hold hot or cold packs securely between the layers. Pockets may be formed, or sewn into, the mesh to hold the packs in a fashion to allow easy insertion or removal. Instead of mesh, fabric with pockets or other attachment means may be used.

While the arm rests 2 are shown as relatively flat conventional type of arm rests, it should be understood that curved types of arm rests, like those used for crutches are also contemplated.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A portable vertebrae decompression support device comprising:
   a pair of arm rests,
   at least one base member having a top surface, bottom surface and sides with the bottom surface and sides being devoid of any protrusions such that the base member is adapted to rest on a seat variety of seats,
   at least one first telescoping tubular support affixed to the base member and to one of the arm rests between a middle and a front end of the arm rest and closer to the front end than to the middle of the arm rest,
   at least one second telescoping tubular support affixed to the base member and one of the arm rests between the middle and a rear end of the arm rest and closer to the rear end than to the middle of the arm rest,
   said first and second telescoping tubular supports being adjustable for selectively adjusting the height of the arm rests with respect to the base member to any one of a plurality of preselected positions, and
   whereby the arm rests are connected to each other via the first and second supports and the base member.

2. The device of claim 1 wherein the support device does not extend to a floor.

3. The device of claim 1 wherein the entire weight of the device does not exceed ten pounds.

4. The device of claim 1 wherein the arm rests are adjustable to be raised or lowered over a range of about 5 to 18 inches.

5. The device of claim 1 wherein straps are provided to restrict the movement of the arms, torso or the device.

6. The device of claim 1 wherein the seat is one of a chair seat, a bench seat, a car seat and a bed.

7. The device of claim 1 wherein the arm rests are padded.

8. The device of claim 1 further comprising a back rest.

9. The device of claim 1 wherein the arm rests are crutch shaped.

10. The device of claim 1 wherein the base has a non-skid type of material on the bottom surface.

11. The device of claim 1 wherein at least one of the first and second telescoping supports has a plurality of holes, each hole identifying one of the preselected positions.

12. The device of claim 11 further comprising a pin releasably biased to engage one of the holes and releasably retain one of the first and second telescoping supports at one of the preselected positions.

13. The device of claim 1 including a back support between the arm rests, the back support having an attached mesh area for comfort, the mesh area also being for holding a hot/cold pack container.

14. A portable vertebrae decompression support device comprising:
- a pair of arm rests,
- first and second base members each having a top surface, bottom surface and sides with the bottom surface being devoid of any protrusions such that each base member is adapted to rest on a variety of seats,
- a first support affixed to the first base member and to a first arm rest,
- a second support fixed to the second base member and to a second arm rest, the second support being affixed nearer a first end of the second arm rest than to the middle of the second arm rest,
- said first and second supports being adjustable for selectively adjusting the height of the arm rests with respect to each respective base member, and
- a first adjustable support adjustably connecting the first and second supports whereby the arm rests are connected to each other via the first adjustable support to vary the distance between the first and second supports and the first and second arm rests, and
- a second adjustable support adjustably connecting the first and second supports whereby the arm rests are connected to each other via the adjustable supports to vary the distance between the first and second supports and the first and second arm rests.

15. The device of claim 14 including a back support coupled to at least one of the adjustable supports, the back support having at least one pocket for insertion and removal of a hot/cold pack container.

16. The device of claim 14 further comprising a back rest.

17. The device of claim 14 wherein the arm rests are crutch shaped.

18. The device of claim 14 wherein the base has a non-skid type of material on the bottom side.

19. The device of claim 14 wherein the arm rests are adjustable to be raised or lowered over a range of about 5 to 18 inches.

* * * * *